United States Patent Office 3,030,720
Patented Apr. 24, 1962

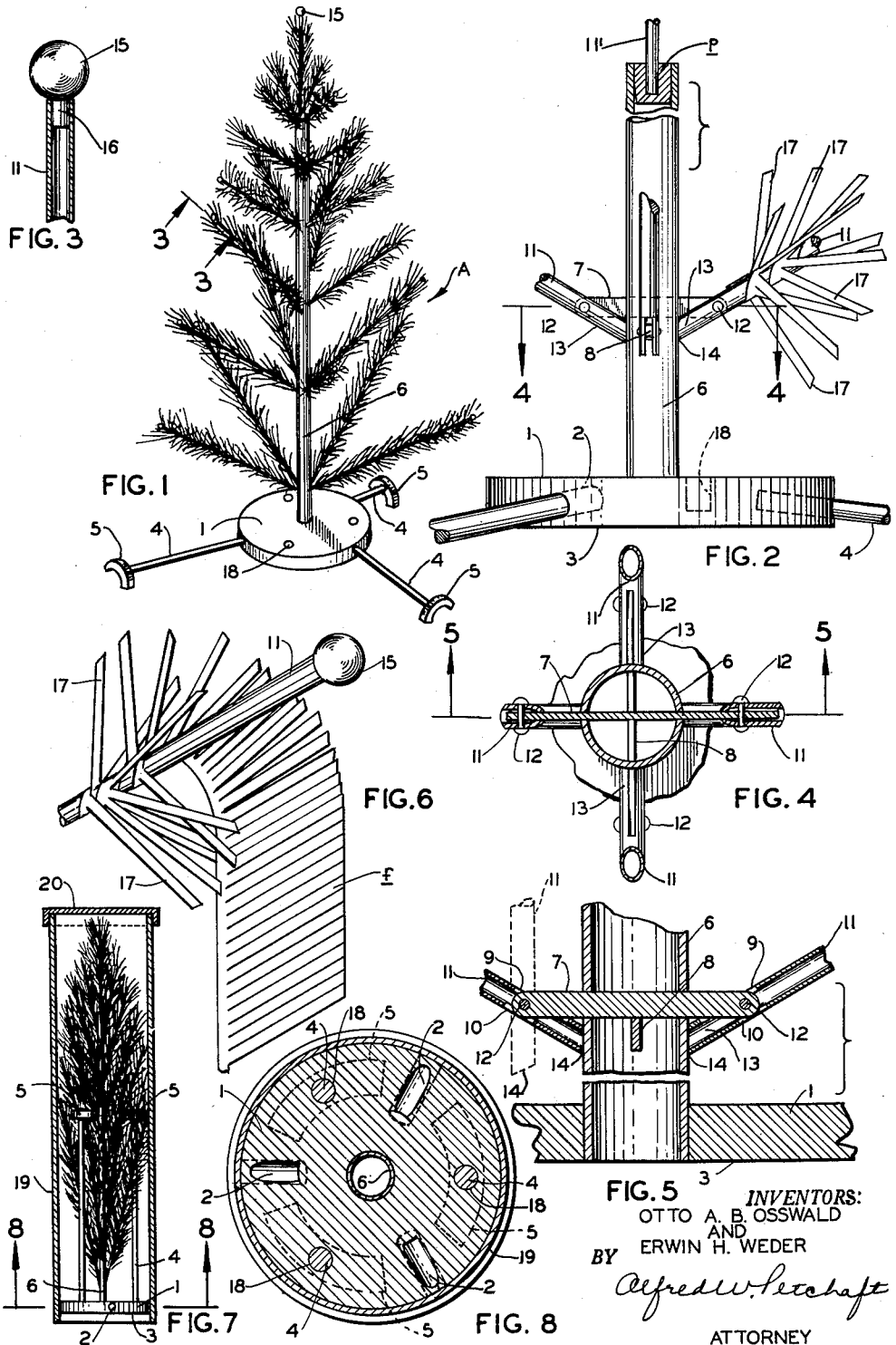

3,030,720
PORTABLE COLLAPSIBLE ARTIFICIAL
CHRISTMAS TREES
Otto A. B. Osswald and Erwin H. Weder, Highland, Ill., assignors of one-half to Highland Supply Corporation, Highland, Ill., a corporation of Illinois
Filed June 8, 1960, Ser. No. 34,673
10 Claims. (Cl. 41—11)

This invention relates in general to certain new and useful improvements in artificial Christmas trees and, more particularly, to artificial trees of the collapsible type.

In recent years, natural Christmas trees have become increasingly more expensive. Moreover, in large cities the necessity of traveling to a remote market area where natural Christmas trees are ordinarily sold during the Christmas season and transporting a rather bulky object of this type involves serious inconvenience. In addition to this, natural Christmas trees are rarely symmetrical and often tend to dry out after being trimmed with the result of loss of needles or foliage.

It is, therefore, one of the principal objects of the present invention to provide an artificial tree which will be practically fireproof, symmetrical, and attractive in appearance.

It is another object of the present invention to provide an artificial tree of the type stated which can be folded up into a very compact unit and housed, within a convenient container for protective storage until the next occasion of use.

It is a further object of the present invention to provide an artificial tree of the type stated which can be very quickly opened up for use whenever desired.

With the above and other objects in view, our invention resides in the novel features of form, construction, arrangement, and combination of parts presently described and pointed out in the claims.

In the accompanying drawing—

FIG. 1 is a perspective view of an artificial Christmas tree constructed in accordance with and embodying the present invention;

FIG. 2 is a fragmentary side-elevational view partly broken away in section of the artificial tree shown in FIG. 1;

FIG. 3 is a fragmentary sectional view taken along line 3—3 of FIG. 1;

FIG. 4 is a fragmentary sectional view taken along line 4—4 of FIG. 2;

FIG. 5 is a fragmentary sectional view taken along line 5—5 of FIG. 4;

FIG. 6 is a fragmentary elevational view of a branch of the artificial tree illustrating the manner in which the branch is fabricated;

FIG. 7 is a longitudinal sectional view of the artificial tree enclosed within a protective housing; and FIG. 8 is a transverse sectional view taken along line 8—8 of FIG. 7.

Referring now in more detail and by reference characters to the drawings, which illustrate a preferred embodiment of the present invention, A designates an artificial tree comprising a circular base member 1 formed of wood, plastic, or other similar material, and provided around its periphery with three equi-spaced socket-forming drill holes 2 which extend radially inwardly approximately halfway toward the center of the base 1 and upwardly at a slight angle to the flat underface or bottom 3 of the base 1 for snugly receiving the ends of radially outwardly extending support-rods 4, the support rods 4 being rigidly provided at their outer ends with foot-forming arcuate elements 5. The foot-forming elements 5 as shown and described herein are in the shape of segments of a circle having a radius approximately three-fourths of the radius of the base 1.

Rigidly mounted in the central portion of the base member and projecting vertically upwardly therefrom is a tubular shaft 6 which is provided, at suitably spaced or convenient intervals along its length, with pairs of diametrally projecting cross-bars 7, 8. As will be seen by reference to FIGS. 4 and 5, the cross-bar 7 extends diametrally through and projects at its opposite ends beyond the shaft 6 and the cross-bar 8 similarly projects diametrally through the shaft 6 at right angles to and directly beneath the cross-bar 7, the cross-bars 7 and 8 being preferably of the same length and being symmetrically arranged with reference to the longitudinal center line of the shaft 6. At their outer ends, the cross-bars 7, 8, project into slots 9, 10, which are formed in the lower ends of tubular limb-simulating rods 11 and are pivotally secured thereto by means of pins 12. The limb-simulating rods 11 extend below the pins 12 in the provision of terminal portions 13 which are cut off to form oblique faces 14 adapted for position-defining abutment against the outer surface of the shaft 6, in the manner best seen in FIG. 5.

In this connection, it should be noted that the four limb-simulating members 11 which are mounted on the lowermost pair of cross-bars 7, 8, should be longer than the other groups of limb-simulating rods 11 which are located upwardly therefrom. Similarly, each higher set of limb-simulating rods 11 should be shorter than the next subjacent set of limb-simulating rods 11 so that the tree A, when opened up into operative position, will assume an attractive conical overall appearance simulative of a natural Christmas tree.

Preferably, though not necessarily, the outer ends of each of the tubular limb-simulating rods 11 is provided with a small ball-shaped ornament 15 having a somewhat radially projecting rod-like element 16 which is diametrally sized for snug-fitting retentive engagement within the tubular end of each limb-simulating rod 11, as best seen in FIG. 3. Preferably, the upper end of the shaft 6 is provided with a centrally drilled plug member *p* which is provided with a short axially upwardly projecting limb-simulating rod 11' which is substantially similar to the limb-simulating rods 11, except that it is fixed and non-pivotal.

The limb-simulating rods 11 and the limb-simulating rod 11' are, furthermore, provided substantially through their entire length from a point which is beyond the pivot pin 12 to a point adjacent to the ornament 15, with needle-simulating spines 17. These may be applied in any suitable manner, but it has been found best, in connection with the present invention, to form these spines 17 from an elongated slitted sheet of metallic foil as shown at *f* in FIG. 6. These sheet *f* may be wrapped spirally around the limb-simulating rods 11 and adhesively or otherwise suitably secured thereto as shown in FIG. 6, thereby resulting in a brilliant, silvery effect which has currently become very popular for artificial Christmas trees.

The base 1 is also provided with three axially extending drill-holes 18 which are located midway between the drill holes 2 and extend downwardly from the top surface of the base 1 to a distance approximately equal to three-fourths of the thickness of the base 1. These drill holes 18 are substantially the same size as the drill holes 2 and adapted for snug-fitting engagement with the ends of the support-rods 4 for purposes presently more fully appearing.

When it is desired to collapse the artificial tree A for storage, the limb-simulating rods 11 can be swung from the outwardly inclined position shown in full lines in FIG. 5 to the more or less vertical position shown in dotted lines in FIG. 5. The diameter of the base 1 is such that, when the tree A is folded up all of the limb-simulating rods 11 and the spines 17 will fall just inside the peripheral limits defined by the outer annular margin of the base 1. This folding-up or collapsing operation can best be carried out by up-ending the tree A or turning it upside down, so to speak, whereupon all of the limb-simulating elements will fall downwardly into more or less vertically depending position. The support-bars 4 may then be removed from the drill-holes 2 and inserted into the drill holes 18 so as to lie in more or less parallel relation to the shaft 6. In this position, the elements 5 will lightly engage and somewhat embrace the outermost spines 17 and gently hold the entire tree in collapsed or so-called storage position.

Provided for snug-fitting and cooperative engagement with the base 1 is an elongated tubular shell or housing 19 which is adapted to fit, at its lower end snugly around the outer periphery of the base 1 and extend upwardly therefrom to a heighth greater than the total length of the collapsed or folded-up tree A. Thus, when the tree A is folded up and inserted within the housing 19 it will be protectively enclosed therein. Preferably, the housing 19 is provided with a removable cap or top closure 20, all as best seen in FIG. 7.

It will thus be evident that the tree A may be folded up into storage-position and placed within the shell 19 for safe protective storage during periods of non-use. When it is folded up and housed, the tree A will be secure against dust and dirt or accidental damage, and may be easily placed in the corner of a closet or any other suitable storage space where it will take up very little room and will be out of the way from Christmas season to Christmas season. Whenever it is necessary to use the tree A, the base 1 and all of the rest of the tree A can be pulled downwardly through the bottom of the shell or housing 19 and quickly removed therefrom without damage or impairment of any of the limb-simulating rods 11 or the spines 17 thereunto attached. As soon as the tree is removed from the housing 19, it may be set up for use by pulling the support rods 4 from the drill holes 18 and inserting them in the drill holes 2. Thereupon, the limb-simulating rods 11 will fall outwardly into opened-up position. If, by any chance, the limb-simulating rods 11 do not immediately fall outwardly, they can be caused to do so by grasping the top of the shaft 6 and gently shaking the entire structure. After the Christmas season is over and it is again desired to store the tree A, it may be folded up or collapsed in the manner above described and inserted into the housing 19 from the top so that the base 1 will, in effect, travel downwardly through practically the whole length of the housing 19. In this manner, the tree A may be inserted into the housing 19 again without danger of damaging the folded-up limb-simulating rods 11 or spines 17. After the tree A has been inserted within the housing 19, the cap 20 may be fit in place to prevent dust, dirt, and moisture from settling on the tree A.

In this connection, it should be noted that the housing 19 may also be made of a transparent or translucent synthetic resin instead of cardboard or spirally wound paper. A methacrylate resin or a linear polyethylene resin would be suitable and it is also possible to use a flexible sleeve formed of a material such as heavy gauge polythene tubing.

It should be understood that changes and modifications in the form, construction, arrangement, and combination of the several parts of the artificial Christmas trees may be made and substituted for those herein shown and described without departing from the nature and principle of our invention.

Having thus described our invention, what we claim and desire to secure by Letters Patent is:

1. A portable ornamental device comprising a hollow elongated housing in the form of a cylindrical tube having openings at opposite ends, closure means for at least one of said ends, a collapsible element removably disposed within the housing, said element including upwardly folding arms provided with fragile ornamentation, said element also having a circular base sized for snug-fitting slidable disposition within the tube and being adapted for insertion at one end of the housing and removal from the other end after being pushed from end to end thereof so that the ornamentation will not be materially damaged by insertion into and removal from the housing, and manually releasable means for optionally engaging the lowermost of the folding arms and holding them, together with all other folding arms, in upwardly swung collapsed position within the tube.

2. A portable ornamental device comprising a hollow elongated housing in the form of a cylindrical tube having openings at opposite ends, closure means for at least one of said ends, a collapsible element removably disposed within the housing, said element including upwardly folding arms provided with fragile ornamentation, said element also having a circular base sized for snug-fitting slidable disposition within the tube and being adapted for insertion at one end of the housing and removal from the other end after being pushed from end to end thereof so that the ornamentation will not be materially damaged by insertion into and removal from the housing, and leg-forming members removably disposed in, and projecting radially from, the base.

3. A portable ornamental device comprising a hollow elongated housing in the form of a cylindrical tube having openings at opposite ends, closure means for at least one of said ends, a collapsible element removably disposed within the housing, said element including upwardly folding arms provided with fragile ornamentation, said element also having a circular base sized for snug-fitting slidable disposition within the tube and being adapted for insertion at one end of the housing and removal from the other end after being pushed from end to end thereof so that the ornamentation will not be materially damaged by insertion into and removal from the housing, and leg-forming members removably disposed in, and projecting radially from, the base, said leg-forming members also being optionally positionable in vertical position on the base so as to extend axially upwardly along the collapsible element and being provided with means for retentively engaging the folding arms and thereby hold them in up-folded position.

4. A portable ornamental device comprising a hollow elongated housing in the form of a cylindrical tube having openings at opposite ends, closure means for at least one of said ends, a collapsible element removably disposed within the housing, said element including upwardly folding arms provided with fragile ornamentation, said element also having a circular base sized for snug-fitting slidable disposition within the tube and being adapted for insertion at one end of the housing and removal from the other end after being pushed from end to end thereof so that the ornamentation will not be materially damaged by insertion into and removal from the housing, and leg-forming members removably disposed in, and projecting radially from, the base, said leg-forming members also being optionally positionable in vertical position on the base so as to extend axially upwardly along the collapsible element and being provided at their outer ends with foot-forming means for retentively engaging the folding arms and thereby hold them in up-folded position.

5. A portable ornamental device comprising a hollow elongated housing in the form of a cylindrical tube having openings at opposite ends, closure means for at least one of said ends, a collapsible element removably disposed within the housing, said element including upwardly folding arms provided with fragile ornamentation, said element also having a circular base sized for snug-fitting slidable disposition within the tube and being adapted for insertion at one end of the housing and removal from the other end after being pushed from end to end thereof so that the ornamentation will not be materially damaged by insertion into and removal from the housing, and leg-forming members removably disposed in, and projecting radially from, the base, said leg-forming members also being optionally positionable in vertical position on the base so as to extend axially upwardly along the collapsible element and being provided at their outer ends with arcuate foot-forming means for retentively engaging the folding arms and thereby hold them in up-folded position.

6. An artificial tree comprising a trunk, provided at intervals along its length with annular rows of diametrically projecting cross-bars extending through said trunk and terminating at opposite ends beyond the trunk, and a limb-simulative arm swingably mounted on each end of said cross-bar for optional disposition in upwardly swung inoperative position and in downwardly swung operative position, each arm being provided with stop-means for engagement with the trunk at a point below the cross-bar to which such arm is attached whereby to hold such arm in operative position.

7. An artificial tree comprising a trunk, provided at intervals along its length with annular rows of diametrically projecting cross-bars extending through said trunk and terminating at opposite ends beyond the trunk, and a limb-simulative arm swingably mounted on each end of said cross-bar for optional disposition in upwardly swung inoperative position and in downwardly swung operative position, each arm being provided with stop-means for engagement with the trunk at a point below the cross-bar to which such arm is attached whereby to hold such arm in operative position at a slightly upwardly inclined angle to the horizontal when the trunk is vertical.

8. An artificial tree comprising a trunk, provided at intervals along its length with annular rows of diametrically projecting cross-bars extending through said trunk and terminating at opposite ends beyond the trunk, and a limb-simulative arm swingably mounted on each end of said cross-bar for optional disposition in upwardly swung inoperative position and in downwardly swung operative position, each arm being provided with stop-means, said arms each being so engaged with its cross-bar at a point upwardly from its lower end so as to provide a downwardly extending terminal portion adapted for engagement with the trunk at a point below the cross-bar to which such arm is attached whereby to hold such arm in operative position.

9. An artificial tree comprising a trunk, provided at intervals along its length with annular rows of diametrically projecting cross-bars extending through said trunk and terminating at opposite ends beyond the trunk, and a limb-simulative arm swingably mounted on each end of said cross-bar for optional disposition in upwardly swung inoperative position and in downwardly swung operative position, each arm being provided with oblique faces adapted for position-defining abutment against the outer surfaces of the trunk at a point below the cross-bar to which such arm is attached, whereby to hold such arm in operative position, at a slightly upwardly inclined angle to the horizontal when the trunk is vertical.

10. An artificial tree comprising a base, a trunk mounted on said base and perpendicular thereto, said trunk being provided at intervals along its length with annular rows of diametrically projecting cross-bars extending through said trunk and terminating at opposite ends beyond the trunk, and a limb-simulative arm swingably mounted on each end of said cross-bar for optional disposition in upwardly swung inoperative position and in downwardly swung operative position, each arm being provided with stop-means for engagement with the trunk at a point below the cross-bar to which such arm is attached whereby to hold such arm in operative position, at a slightly upwardly inclined angle to the horizontal when the trunk is vertical, the diameter of said base being such that when the limb-simulative arms are in an upwardly swung inoperative position, said limb will fall inside the peripheral limits defined by the outer annular margin of the base.

References Cited in the file of this patent
UNITED STATES PATENTS

| | | |
|---|---|---|
| 267,277 | Strasser | Nov. 7, 1882 |
| 1,492,709 | Hall | May 6, 1924 |
| 2,708,324 | Wedden | May 17, 1955 |
| 2,781,596 | Curran | Feb. 19, 1957 |
| 2,893,149 | Reece et al. | July 7, 1959 |
| 3,014,300 | Paul et al. | Dec. 26, 1961 |